United States Patent
McNeff et al.

(10) Patent No.: US 8,887,774 B2
(45) Date of Patent: Nov. 18, 2014

(54) FUEL VAPOR RETENTION SYSTEM AND METHODS

(75) Inventors: Charles Vincent McNeff, Andover, MN (US); Larry C. McNeff, Anoka, MN (US)

(73) Assignee: Sartec Corporation, Anoka, MI (US)

( * ) Notice: Subject to any disclaimer, the term of this patent is extended or adjusted under 35 U.S.C. 154(b) by 654 days.

(21) Appl. No.: 12/566,198

(22) Filed: Sep. 24, 2009

(65) Prior Publication Data

US 2010/0132815 A1 Jun. 3, 2010

Related U.S. Application Data

(60) Provisional application No. 61/099,620, filed on Sep. 24, 2008.

(51) Int. Cl.
- *B65B 1/04* (2006.01)
- *B65D 90/22* (2006.01)
- *B60K 15/03* (2006.01)
- *B60K 15/035* (2006.01)

(52) U.S. Cl.
CPC ... *B60K 15/03504* (2013.01); *B60K 2015/0344* (2013.01); *B60K 2015/03514* (2013.01); *B60K 2015/03171* (2013.01)
USPC ................. 141/307; 141/44; 141/52; 141/53; 220/749

(58) Field of Classification Search
CPC ................................................ B60K 15/03504
USPC ......... 141/52, 53, 59, 286, 302, 325, 350, 25; 137/511, 528, 571, 588, 587; 220/745–750, 720, 722, 530
See application file for complete search history.

(56) References Cited

U.S. PATENT DOCUMENTS

| | | | | |
|---|---|---|---|---|
| 1,669,183 A * | 5/1928 | Wilson | ........................ | 220/721 |
| 2,111,839 A * | 3/1938 | Chenicek | ...................... | 220/722 |
| 2,147,699 A * | 2/1939 | Hardiman | ..................... | 165/278 |
| 3,494,274 A * | 2/1970 | Evers | ........................ | 99/646 R |
| 3,977,379 A * | 8/1976 | Weissenbach | ............... | 123/518 |
| 4,338,826 A * | 7/1982 | Jacoby et al. | ............. | 73/864.62 |
| 4,836,835 A * | 6/1989 | Harris et al. | ..................... | 96/113 |
| 5,343,905 A * | 9/1994 | Gryc et al. | ..................... | 141/59 |
| 5,740,842 A * | 4/1998 | Maier et al. | ..................... | 141/45 |
| 6,000,426 A * | 12/1999 | Tuckey et al. | ................. | 137/588 |
| 6,318,398 B1 * | 11/2001 | Ehrman et al. | .................. | 137/43 |
| 6,491,030 B2 * | 12/2002 | Zapp | ............................. | 123/516 |
| 7,111,653 B2 * | 9/2006 | Cnossen et al. | ............... | 141/351 |
| 2008/0271811 A1 * | 11/2008 | Healy | ............................. | 141/59 |

* cited by examiner

*Primary Examiner* — Timothy L Maust
(74) *Attorney, Agent, or Firm* — Pauly, Devries Smith & Deffner, LLC.

(57) ABSTRACT

Embodiments of the present invention relate to fuel tanks including features for capturing vapors displaced during a filling process. In an embodiment, the invention includes a fuel tank including a housing defining an interior volume; an inflow conduit providing fluid communication between the outside of the housing and the interior volume; a check-valve coupled to the inflow conduit, the check-valve configured to allow fuel to flow through the check-valve into the interior volume but prevent the flow of gases from the interior volume to the outside of the housing; an expansion member configured to reversibly change in volume; and a vent conduit providing fluid communication between the expansion member and the interior volume of the housing. Other embodiments are also described herein.

10 Claims, 5 Drawing Sheets

FUEL VAPOR RETENTION SYSTEM AND METHODS

This application claims the benefit of U.S. Provisional Application No. 61/099,620 filed Sep. 24, 2008, the contents of which are herein incorporated by reference.

FIELD OF THE INVENTION

The present invention relates to fuel tanks More specifically, the present invention relates to fuel tanks including features for capturing vapors displaced during a filling process.

BACKGROUND OF THE INVENTION

Petroleum products have many applications in industrialized societies including as an energy source. Common examples of petroleum products used as energy sources include refined petroleum products such as gasoline, diesel, and kerosene. Unfortunately, various petroleum products may include amounts of potentially harmful volatile products such as benzene and other aromatic compounds that are known carcinogens. In the context of automobiles and other vehicles, such as trains and planes, these harmful volatile products represents a significant health hazard to humans. This is because fuel vapors, including some amount of harmful volatile products, are forced out of fuel tanks during the fuel-filling process (as described herein with reference to FIGS. 1 and 2).

For at least these reasons, there is a need for systems and devices that can capture and/or avoid the release of fuel vapors into the atmosphere during the process of filling a fuel tank.

SUMMARY OF THE INVENTION

Embodiments of the present invention relate to fuel tanks including features for capturing vapors displaced during a filling process. In an embodiment, the invention includes a fuel tank including a housing defining an interior volume; an inflow conduit providing fluid communication between the outside of the housing and the interior volume; a check-valve coupled to the inflow conduit, the check-valve configured to allow fuel to flow through the check-valve into the interior volume, but prevent the flow of gases from the interior volume to the outside of the housing; an expansion member configured to reversibly change in volume; and a vent conduit providing fluid communication between the expansion member and the interior volume of the housing.

The above summary of the present invention is not intended to describe each discussed embodiment of the present invention. This is the purpose of the figures and the detailed description that follows.

BRIEF DESCRIPTION OF THE FIGURES

The invention may be more completely understood in connection with the following drawings, in which.

While the invention is susceptible to various modifications and alternative forms, specifics thereof have been shown by way of example and drawings, and will be described in detail. It should be understood; however, that the invention is not limited to the particular embodiments described. On the contrary, the intention is to cover modifications, equivalents, and alternatives falling within the spirit and scope of the invention.

DETAILED DESCRIPTION OF THE INVENTION

Figure 1:
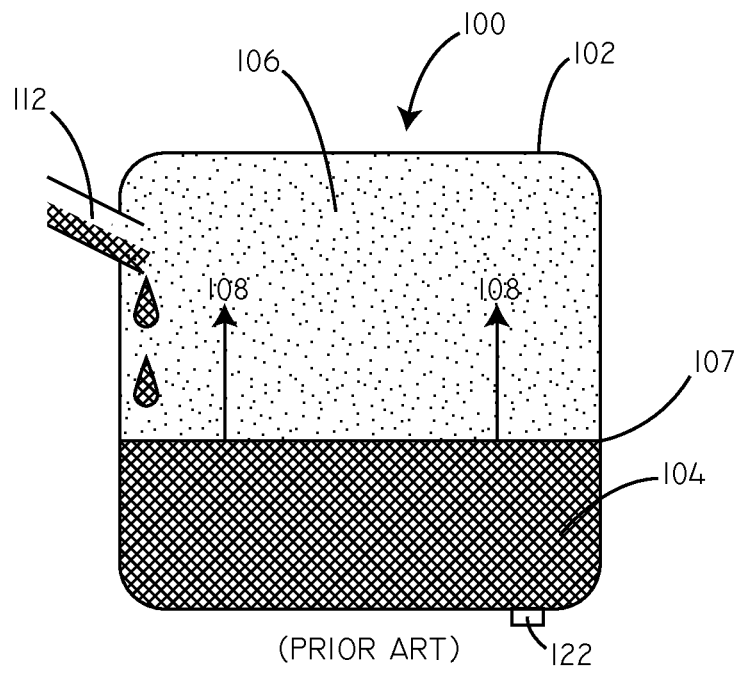
FIG. 1 is schematic cross-sectional view of a fuel tank.

Referring now to FIG. 1, a fuel tank 100 is shown illustrating how fuel vapor is forced out of the tank 100 during normal filling operations. The tank 100 includes a housing 102 defining an interior volume. Liquid fuel 104 is inserted into the tank 100 through an inflow conduit 112. The liquid fuel 104 displaces a portion of the interior volume of the tank 100. Generally, the liquid fuel 104 passes out of the tank 100 through a separate outflow conduit 122 for end use, such as for use in an engine. Typically, components of the liquid fuel 104 are volatile, having a relatively high vapor pressure. As such, the space within the interior volume that is not displaced by the liquid fuel is usually filled with a mixture of volatile fuel components (fuel vapor) and air (ambient gases).

Figure 2:
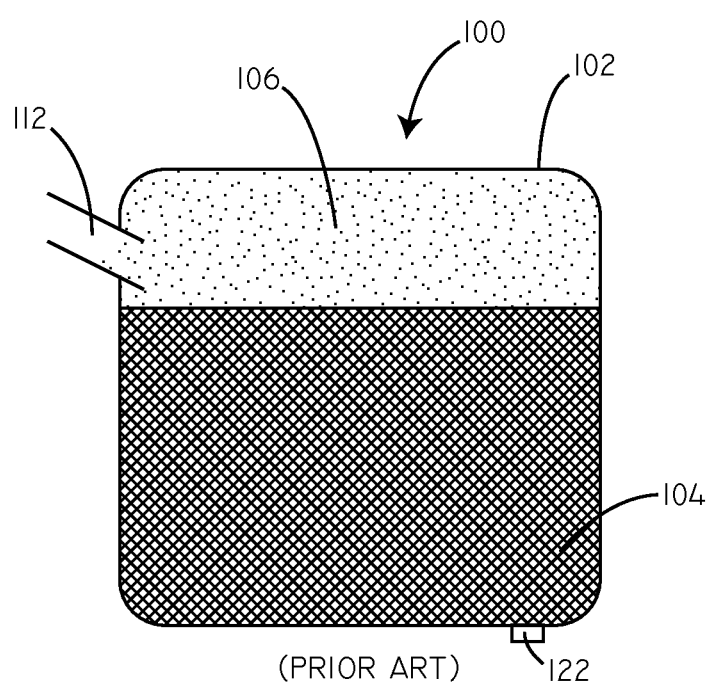
FIG. 2 is another schematic cross-sectional view of the fuel tank of FIG. 1.

Additional liquid fuel that is added to the tank 100 through the inflow conduit 112 typically settles to the bottom of the tank through gravitational forces. As liquid fuel is added, the interfacial line 107 between the liquid fuel and the mixture of fuel vapor and air above the fuel moves in the direction of arrows 108. This movement, in turn, effectively reduces the amount of space within the housing 102 for the fuel vapor and air mixture. FIG. 2 shows the fuel tank 100 after liquid fuel has been added, with the liquid fuel displacing a larger amount of the fuel tank than as shown in FIG. 1. In order to compensate for the increasing volume of liquid fuel within the tank 100, an amount of the fuel vapor and air mixture is forced out of the inflow conduit and into the air surrounding the fuel tank 100.

Figure 3:
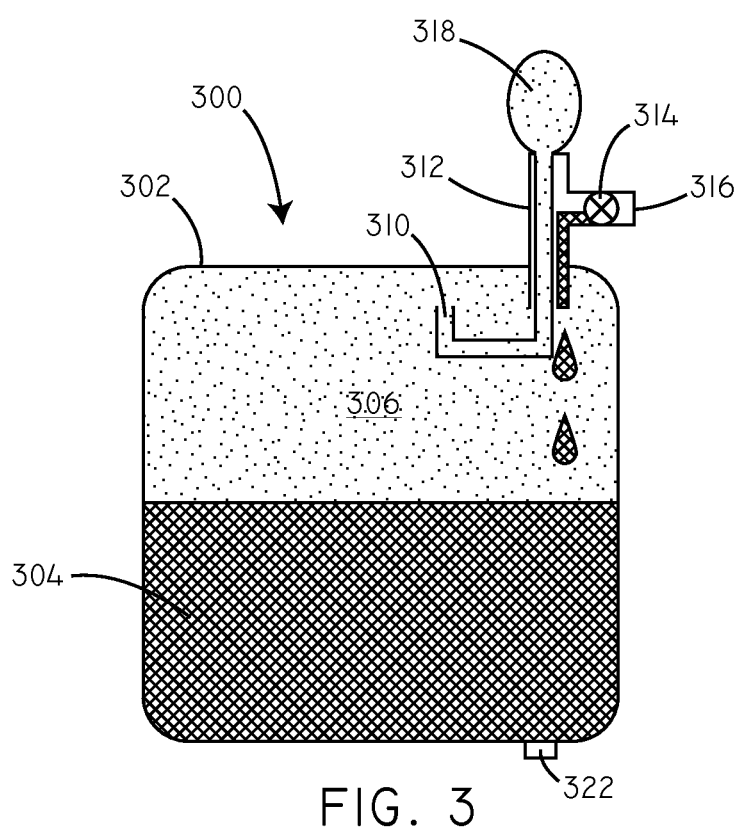
FIG. 3 is schematic cross-sectional view of a fuel tank in accordance with an embodiment of the invention.

Included among embodiments herein are systems and methods for capturing the mixture of air and fuel vapor that is displaced from a fuel tank during the process of filling the fuel tank with liquid fuel. Referring now to FIG. 3, an embodiment of a fuel tank 300 in accordance with an embodiment of the invention is shown. The fuel tank 300 includes a housing 302 defining an interior volume 306. In some embodiments, the housing 302 can be made of a substantially rigid material, such as a metal or a rigid polymer. The tank 300 also includes an inflow conduit 312 providing fluid communication between the outside of the housing and the interior volume 306. In this embodiment, the inflow conduit 312 is configured in a "T" configuration. However, it will be appreciated that the inflow conduit 312 can take on many different configurations in various embodiments included within the scope herein.

The tank 300 also includes a check-valve 314 (or one-way valve) coupled to the inflow conduit 312. The check-valve 314 can be, for example, a ball-valve or other type of one-way fluid handling valve known to those of skill in the art. The check-valve 314 can be configured to allow liquid fuel to flow through the check-valve 314 and into the interior volume 306, but prevent the flow of gases (such as fuel vapor) from the interior volume 306 to the outside of the housing 302.

The fuel tank 300 can also include an expansion member 318. The expansion member 318 can be configured to reversibly change in volume, such as between a first substantially deflated configuration and second substantially inflated configuration. In an embodiment, the expansion member 318 can take on a balloon-like configuration. Though it will be appreciated that the expansion member 318 can also take on many other different shapes. The expansion member 318 can be comprised of a material that stretches, such as an elastomeric material or the like. In some embodiments the expansion member 318 can be comprised of a polymeric material.

The fuel tank 300 also includes a vent conduit 310 providing fluid communication between the expansion member 318 and the interior volume 306 of the housing 302. In some embodiments, such as that shown in FIG. 3, the vent conduit 310 can be disposed within the inflow conduit 312.

The vent conduit 310 can be configured to prevent liquid fuel 304 from entering the vent conduit 310. For example, the end of the vent conduit 310 can be up-turned such that liquid fuel 304 would be unlikely to enter the vent conduit 310, even when splashing around within the interior volume 306. In some embodiments a cap (not shown) can be disposed over the end of the vent conduit 310 that allows the flow of gases, but substantially resists the flow of liquids, such as for example a cap including a membrane made of expanded polytetrafluoroethylene (e-PTFE) or the like. Optionally, in some embodiments, the fuel tank 300 may also include an outflow conduit 322 providing fluid communication between interior volume 306 and a fuel line (not shown).

In operation, during the filling process, liquid fuel is inserted into an orifice 316 on the inflow conduit 312. The liquid fuel passes through the check valve 314, through the rest of the inflow conduit 312, and is deposited at the bottom of the tank along with the rest of the liquid fuel 304. As the liquid fuel 304 displaces an ever greater amount of the interior volume 306, the fuel vapor and air mixture above the liquid fuel is forced into the vent conduit 310 and then into the expansion member 318, which expands in order to accommodate the inflowing volume of gases. In this manner, the fuel vapor and air mixture is captured by the expansion member 318 and prevented from entering the atmosphere on the outside of the fuel tank 300.

After the filling process, when the fuel tank 300 is being used to supply liquid fuel for an end use, such as to operate an engine, the fuel vapor and air mixture can pass from the expansion member 318 back into the interior volume 306 of the housing 302. Specifically, as liquid fuel from the fuel tank 300 is used up, the proportion of the interior volume 306 displaced by the liquid fuel is reduced, and some of the fuel vapor and air mixture from the expansion member 318 returns to the fuel tank to the space (head space) above the liquid fuel 304.

Figure 4:
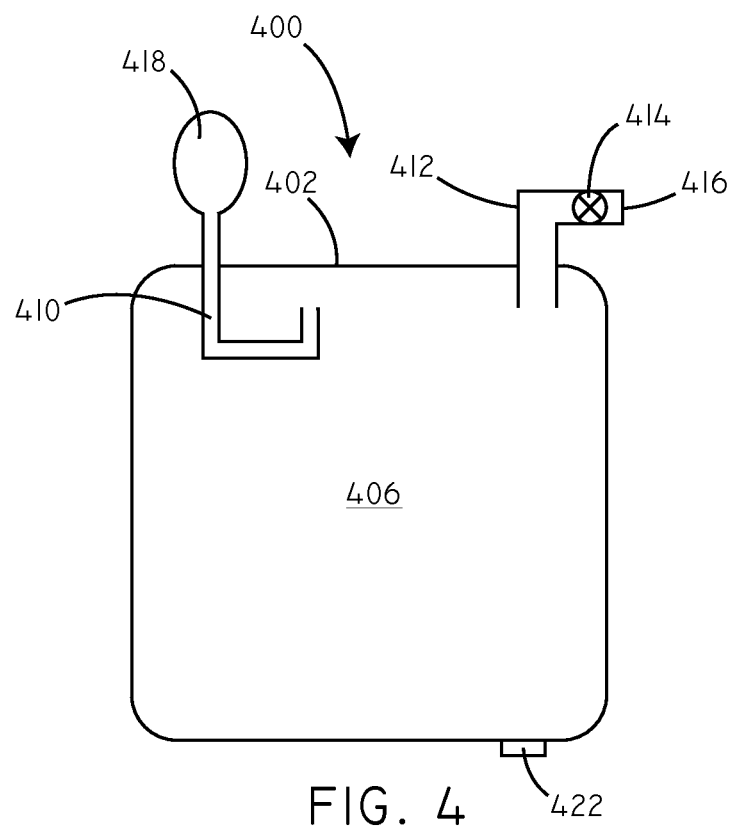
FIG. 4 is schematic cross-sectional view of a fuel tank in accordance with another embodiment of the invention.

It will be appreciated that in some embodiments the liquid fuel may enter the fuel tank through a conduit other than a "T" shaped conduit such as that shown in FIG. 1. In addition, the vent conduit and the expansion member can be disposed separately from the inflow conduit. Referring now to FIG. 4, a schematic view is shown of a fuel tank 400 in accordance with another embodiment. The fuel tank 400 includes a housing 402 surrounding an enclosed volume 406. The fuel tank 400 further includes an inflow conduit 412 including a check valve 414. Fuel can enter the inflow conduit 412 through an orifice 416. The tank can also include a vent conduit 410. The vent conduit 410 can be in fluid communication with an expansion member 418. Optionally, the fuel tank 400 can also include an outflow conduit 422.

It will be appreciated that in various embodiments herein, the expansion member is disposed on the outside of the housing which serves to hold the liquid fuel. While not intending to be bound by theory, it is believed that this configuration can provide a safety advantage in that it can effectively increase the burst strength of the housing holding the fuel. In some contexts, such as when used with a vehicle, the housing may, in rare circumstances, be subjected to substantial compressive forces, such as in the case of a vehicular accident. As fuel is generally quite flammable, there can be safety advantages associated with having a fuel tank which resists bursting even under substantial compressive forces. Embodiments of fuel tanks described herein that include an expansion member disposed outside of the housing can effectively increase burst strength by reducing peak pressures experienced inside of the housing during rapid compression of the housing. That is, gases within the interior volume of the housing can move to the expansion member during compression of the housing, thereby reducing peak pressures experienced within the interior volume of the housing.

Figure 5:
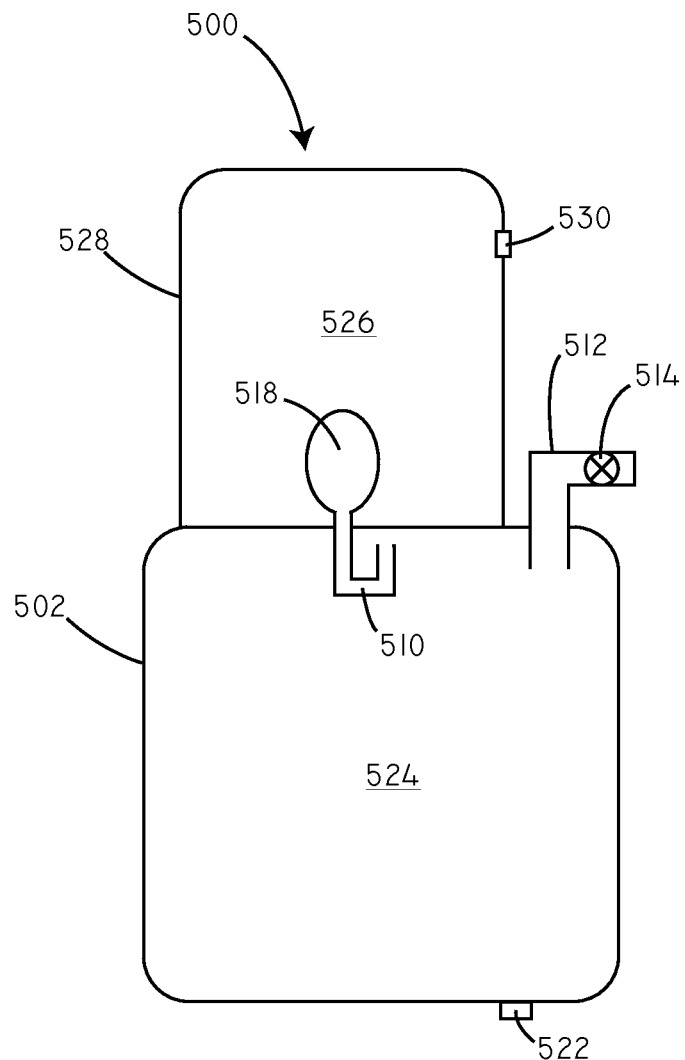
FIG. 5 is schematic cross-sectional view of a fuel tank in accordance with another embodiment of the invention.

In some contexts, it can be desirable to shield the expansion member from potential damage which may result from accidental causes. One approach to this can include providing a second housing disposed around the expansion member that shields the second housing from potential damage. Referring now to FIG. 5, a schematic cross-sectional view is shown of a fuel tank 500 in accordance with an embodiment herein including a second housing 528 configured to protect an expansion member 518. The fuel tank 500 can include a first housing 502 defining a first interior volume 524 and the second housing 528 defining a second interior volume 526. A fuel inflow conduit 512, including a check valve 514, is coupled to the first housing 502 and provides one-way fluid communication between the outside of the fuel tank and the first interior volume 524. In some embodiments, the fuel tank can also include an outflow conduit 522 coupled to the first interior volume 524.

The fuel tank 500 can also include a vent conduit 510 in fluid communication with an expansion member 518. The expansion member 518 can be disposed within the second interior volume 526 defined by the second housing 528. The second housing 528 can be a rigid material, such as a metal or a rigid polymer. The second housing 528 can include a breather port 530 configured to provide fluid communication between the outside of the fuel tank and the second interior volume 526. The breather port 530 can function to equalize the pressure between the second interior volume 526 and the outside of the fuel tank 500 such that expansion of the expansion member 518 within the second interior volume 526 is not inhibited.

It will be appreciated that fuel tanks in accordance with embodiments herein can be sized in order to accommodate many different end uses. In some embodiments the fuel tank may include an interior volume for holding liquid fuel that is less than about 1 gallon in volume. In some embodiments, the fuel tank may include an interior volume that is greater than about 10,000 gallons in volume. In some embodiments, the interior volume of the fuel tank is between about 0.1 gallons and 1000 gallons in volume. In some embodiments, the interior volume of the fuel tank is between about 1 and about 40 gallons in volume.

Figure 6:
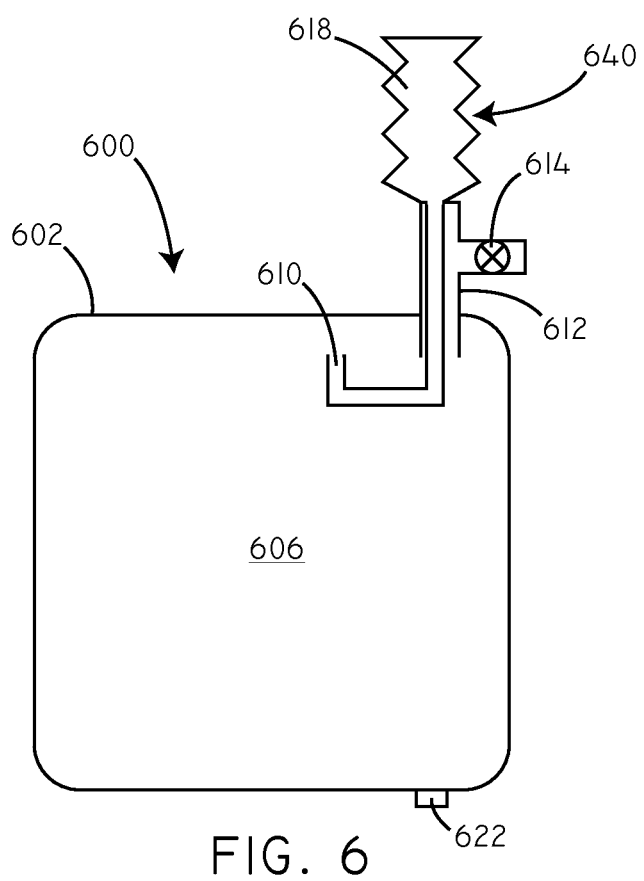
FIG. 6 is a schematic cross-sectional view of a fuel tank in accordance with another embodiment of the invention.

It will be appreciated that the expansion member can take on many different physical configurations. Referring now to FIG. 6, a schematic view of a fuel tank 600 in accordance with yet another embodiment is shown. The fuel tank 600 includes a housing 602 defining an interior volume 606. The fuel tank 600 further includes an inflow conduit 612 coupled to a check valve 614. The fuel tank 600 further includes a vent conduit 610 coupled to an expansion member 618. In this embodiment, the expansion member 618 includes pleated sides 640.

The pleated sides 640 can flex such that the expansion member 618 can expand and contract in volume with an accordion-like action. The fuel tank can also include an outflow conduit 622.

It will be appreciated that configuring the expansion member 618 with pleated sides can accommodate an ability to expand and contract in volume while allowing the expansion member to be constructed of different materials than might be practical with balloon-like configurations such as that shown in FIG. 3. However, it will be appreciated that many different configurations for the expansion member 618 are contemplated and included herein.

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention. As such, it should be understood that many variations and modifications may be made while remaining within the spirit and scope of the invention.

Nothing herein is to be construed as an admission that the inventors are not entitled to antedate any publication and/or patent, including any publication and/or patent cited herein.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, device, or other structure that is constructed or configured to perform a particular task or adopt a particular configuration. The phrase "configured" can be used interchangeably with other similar phrases such as arranged and configured, constructed and arranged, constructed, manufactured and arranged, and the like.

The invention claimed is:

1. A vehicular fuel tank comprising:
   a housing defining an interior volume;
   an inflow conduit providing fluid communication between the outside of the housing and the interior volume;
   a check-valve coupled to the inflow conduit, the check-valve configured to allow fuel to flow through the check-valve into the interior volume but prevent the flow of gases from the interior volume to the outside of the housing;
   an expansion member configured to reversibly change in volume, the expansion member disposed outside of the housing;
   a vent conduit providing fluid communication between the expansion member and the interior volume of the housing, the vent conduit passing through the inflow conduit and out of the housing to the expansion member;
   a portion of the vent conduit disposed within the interior volume;
   the portion of the vent conduit disposed within the interior volume comprising a first vent opening, the first vent opening facing in an opposite direction from the direction the vent conduit enters the interior volume to prevent liquid fuel from entering the vent conduit from the interior volume of the housing;
   the vent conduit comprising a second vent opening disposed at or in the expansion member, the second vent opening facing in the same direction as the first vent opening, and the second vent opening in a plane above the first vent opening to prevent liquid fuel that has entered the vent conduit from entering the expansion member.

2. The vehicular fuel tank of claim 1, the expansion member comprising an elastomeric composition.

3. The vehicular fuel tank of claim 1, the expansion member comprising a polymer.

4. The vehicular fuel tank of claim 1, the expansion member comprising a housing with pleated sides.

5. The vehicular fuel tank of claim 1, the check-valve comprising a ball-valve.

6. The vehicular fuel tank of claim 1, the housing comprising a substantially rigid material.

7. The vehicular fuel tank of claim 1, the housing comprising a material selected from the group consisting of metals and polymers.

8. The vehicular fuel tank of claim 1, the interior volume comprising between about 1 and about 40 gallons in volume.

9. The vehicular fuel tank of claim 1, the fuel tank further comprising
   a second housing defining a second interior volume, the expansion member disposed within the second interior volume; and
   the second housing defining a breather port providing fluid communication between the outside of the fuel tank and the second interior volume.

10. The vehicular fuel tank of claim 1, wherein the check valve is disposed adjacent the top of the housing.

* * * * *